United States Patent
Hyppanen

[11] Patent Number: 5,772,969
[45] Date of Patent: Jun. 30, 1998

[54] METHOD AND APPARATUS FOR RECOVERING HEAT IN A FLUIDIZED BED REACTOR

[75] Inventor: Timo Hyppanen, Karhula, Finland

[73] Assignee: Foster Wheeler Energia OY, Helsinki, Finland

[21] Appl. No.: 340,875

[22] Filed: Dec. 6, 1994

Related U.S. Application Data

[63] Continuation of Ser. No. 149,342, Nov. 9, 1993, abandoned, which is a continuation-in-part of Ser. No. 973,396, Nov. 10, 1992, Pat. No. 5,341,766, Ser. No. 41,571, Apr. 5, 1993, Pat. No. 5,332,553, Ser. No. 41,580, Apr. 5, 1993, Pat. No. 5,345,896, Ser. No. 66,277, May 26, 1993, Pat. No. 5,540,894, Ser. No. 89,810, Jul. 12, 1993, and Ser. No. 124,767, Sep. 22, 1993, Pat. No. 5,425,412.

[51] Int. Cl.[6] .......................... F27B 15/14; F27B 15/16
[52] U.S. Cl. .................... 422/146; 422/139; 422/141; 422/143; 422/147
[58] Field of Search .......................... 422/141–142, 422/145, 146, 147; 122/4 D; 110/245; 431/7, 170; 432/58; 165/104.16, 104.18; 34/578, 589, 591, 363, 370

[56] References Cited

U.S. PATENT DOCUMENTS

| | | | |
|---|---|---|---|
| 3,807,090 | 4/1974 | Moss | 422/144 X |
| 5,014,652 | 5/1991 | Hyldgaard | 122/4 D |
| 5,069,170 | 12/1991 | Gorzegno et al. | 422/146 |
| 5,140,950 | 8/1992 | Abdulally | 122/4 D |
| 5,141,708 | 8/1992 | Campbell, Jr. et al. | 422/141 X |
| 5,205,350 | 4/1993 | Hirsch et al. | 165/104.18 |
| 5,275,788 | 1/1994 | Stoholm | 422/141 X |
| 5,281,398 | 1/1994 | Hyppanen et al. | 422/146 |

*Primary Examiner*—Hien Tran
*Attorney, Agent, or Firm*—Nixon & Vanderhye P.C.

[57] ABSTRACT

A method and apparatus for recovering heat from solid particles in a fluidized bed reactor, utilize a heat transfer chamber, having heat transfer surfaces disposed therein. Hot solid particles are continuously fed into the heat transfer chamber and gas is introduced into and discharged from the heat transfer chamber. Gas is introduced into the heat transfer chamber for controlling the flow of solid particles therein. The heat transfer chamber is divided into at least one heat transfer zone and at least one solid particle transport zone, by providing more heat transfer surfaces in the heat transfer zones (e.g. 90% or more of the total heat transfer area) than in the solid particle transport zones. The heat transfer is controlled by introducing separately controlled flows of gas into the heat transfer zones and the solid particle transport zones.

20 Claims, 3 Drawing Sheets

METHOD AND APPARATUS FOR RECOVERING HEAT IN A FLUIDIZED BED REACTOR

CROSS REFERENCE TO RELATED APPLICATIONS

This is a continuation of application Ser. No. 08/149,342, filed Nov. 9, 1993, now abandoned, which was a CIP of application Ser. No. 07/973,396, filed Nov. 10, 1992 (Now U.S. Pat. No. 5,341,766); and a CIP of application Ser. No. 08/041,571, filed Apr. 5, 1993 (now U.S. Pat. No. 5,332,553); and a CIP of application Ser. No. 08/041,580, filed Apr. 5, 1993 (now U.S. Pat. No. 5,345,896); and a CIP of application Ser. No. 08/066,277, filed May 26, 1993 now U.S. Pat. No. 5,540,894; and a CIP of application Ser. No. 08/089,810, filed Jul. 12, 1993; and a CIP of application Ser. No. 08/124,767, filed Sep. 22, 1993, now U.S. Pat. No. 5,425,412.

BACKGROUND OF THE INVENTION

The present invention refers to a method and apparatus for recovering heat from solid particles in a fluidized bed reactor, comprising a processing chamber with a fluidized bed of solid particles therein, and utilizing a heat transfer chamber, which is connected to the processing chamber and has heat transfer surfaces disposed therein.

Heat is recovered by continuously introducing hot solid particles from the processing chamber into the heat transfer chamber, introducing gas into the heat transfer chamber, for controlling the flow of solid particles within the heat transfer chamber, recovering heat with heat transfer surfaces disposed in the heat transfer chamber, and continuously recycling solid particles discharged from the heat transfer chamber into the processing chamber. The apparatus utilized comprises inlet means for introducing a continuous flow of hot solid particles from the processing chamber into the heat transfer chamber, outlet means for continuously recycling solid particles from the heat transfer chamber into the processing chamber, and nozzle means for introducing gas into the heat transfer chamber.

Fluidized bed reactors, such as circulating fluidized bed reactors, are used in a variety of different combustion, heat transfer, chemical or metallurgical processes. Typically heat is recovered from fluidized bed combustion processes by heat transfer surfaces provided within the combustion chamber and/or within a convection section disposed in the gas pass after the combustion chamber. It has also been suggested to dispose heat transfer surfaces in separate external heat exchangers connected to an external circulation of solid material from the combustion chamber.

In circulating fluidized bed (CFB) reactors, it has been suggested to connect the external heat thereby or recycle heat exchanger to the return duct, so as to recover heat from the hot solid material being recycled in the system. Heat transfer surfaces are disposed in a fluidized bed formed of circulating material in the external heat exchanger. In the external heat exchanger the heat transfer can, to some extent, be controlled by controlling the fluidizing gas flow around the heat transfer surfaces.

In an external heat exchanger, connected to a system continuously providing hot solid material, such as a return duct in a CFB reactor, the fluidizing gas also controls the transport of solid material through the heat exchanger. It is therefore not possible to control the heat transfer in the external heat exchanger independently from the solid flow through the heat exchanger. It is e.g. not possible to shut off heat transfer completely, e.g., during start up or low load conditions, even if no or very little heat transfer is taking place, as shutting off fluidizing gas flow would also shut off the flow of solid material.

In systems having external heat exchangers it has therefore been suggested to divide the solid material flow into two portions, one portion flowing into the heat exchanger and the other portion by-passing the heat exchanger. The heat transfer is controlled by controlling the portion of solid material flowing through the heat exchanger. The system requires additional mechanical valves for controlling the two solid flows. The construction is rather complicated, vulnerable and space consuming and adds to the cost of the system.

SUMMARY OF THE INVENTION

According to the present invention, a method and apparatus are provided for recovering heat from fluidized bed reactors in which above mentioned drawbacks have been minimized. The present invention provides for simple control of the heat exchanger or heat transfer chamber, connected to a solid circulation in a fluidized bed reactor, e.g. to a return duct of a CFB reactor. The present invention also provides an improved method for controlling heat transfer in an external heat exchanger connected to a system delivering a continuous flow of hot solid material.

According to the present invention, the improved method of recovering heat from solid particles in a fluidized bed reactor, utilizing a heat transfer chamber, comprises the steps of dividing the heat transfer chamber into at least one heat transfer zone and at least one solid particle transport zone, by providing more heat transfer surfaces in the heat transfer zones than in the solid particle transport zones, and controlling the heat transfer in the heat transfer chamber by introducing separately controlled flows of gas into the heat transfer zones and the solid particle transport zones.

According to the present invention there is further provided an improved apparatus for recovering heat from solid particles in a fluidized bed reactor, utilizing a heat transfer chamber. The apparatus comprises means for dividing the heat transfer chamber into at least one heat transfer zone and at least one solid particle transport zone, this means including more heat transfer surfaces disposed in the heat transfer zones than disposed in the solid particle transport zones; and means for controlling the heat transfer in the heat transfer chamber, this means including separately controlled means for introducing flows of gas into the heat transfer zones and the solid particle transport zones.

According to a preferred embodiment of the invention, the heat transfer chamber is divided into several heat transfer zones, disposed side by side horizontally or vertically, and separated from each other by solid particle transport zones. Fluidizing gas, or another transporting gas able to control the flow of particles in the zones, is introduced separately to the heat transfer zones and the solid particle transport zones, e.g. through wind boxes disposed below the heat transfer chamber or through nozzles disposed in the walls of the heat transfer chamber.

By separately controlling the fluidizing or transporting gas flows it is possible to control the internal flow of solid particles within the heat transfer chamber. It is e.g. possible to shut off or decrease flow of fluidizing gas in one heat transfer zone to such an extent that no or almost no solid material is flowing around the heat transfer surfaces, so that heat transfer to the surfaces decreases to a minimum.

At the same time the total solid flow through the heat transfer chamber is kept at a desired level, e.g. a constant level, by the fluidization gas flows or transporting gas flows introduced into the solid particle transporting zones around the heat transfer zone being shut off.

The fluidization of the heat transfer zones controls to some extent the internal flow of solid particles within the heat transfer chamber, i.e. controls the amount of fresh material coming from adjacent zones into contact with the heat transfer surfaces. By separately controlling the flow of fluidizing or transporting gas being introduced into the heat transfer zones and the solid particle transport zones, it is possible to control the path solid particles will take in the heat transfer chamber or the path of solid particles between one or more inlets and one or more outlets in the heat transfer chamber.

Solid material may be discharged from the heat transfer chamber through overflow openings disposed at desired locations at a desired level in the heat transfer chamber. The solid material may also be discharged through openings disposed below the surface level of the fluidized bed in the heat transfer chamber. The openings preferably then constitute solid flow seals for providing a way to control the discharge of solid material. Fluidizing or transporting gas flows are introduced to control the flow of solid material through the openings.

Discharge outlets providing a solid flow seal may include several horizontally elongated, vertically narrow, slot like channels disposed one above the other in a frame like construction. The height of each slot should be less than half of the length of the channel formed in order to prevent solid material from flowing by gravity through the channel.

In the heat transfer chamber the heat transfer surfaces are preferably disposed in the bed of solid particles therein, but may extend upwardly beyond the bed. Heat may also be recovered by heat transfer surfaces disposed in the walls of the heat transfer chamber.

The heat transfer chamber may advantageously be disposed in the lower part of the return duct of a circulating fluidized bed reactor. The lower part of the return duct may have to be extended to provide enough space for heat transfer surfaces, the extended portion thereof, e.g., having a larger horizontal cross section than the upper part of the return duct. In CFB boilers evaporation or superheating of steam may advantageously take place in such a return duct as in CFB systems heat is readily available for evaporation and/or superheating in the circulating mass of hot particles. The gas atmosphere in the heat transfer zone in the return duct is very limited, and contains primarily clean gas, thereby providing very advantageous conditions for superheating. The superheaters may therefore be heated to much higher temperatures than normal in conventional combustion chambers, especially when flue gases contain corrosive components.

The heat transfer from particles to superheater surfaces is controlled by introducing a separately controlled fluidizing flow of suitable gas into at least a part of the heat transfer zone, providing movement of particles close to the superheater surfaces. Increased flow around the surfaces will increase the heat transfer to the surfaces. Gas, such as air or inert gas, may be introduced as fluidizing gas for heat transfer control through several separate nozzles. Also gas introduced from the side walls may be used for controlling heat transfer. The heat transfer may be controlled by the location and/or flow rate of gas introduced into different parts of the heat transfer chamber.

It may in some cases be necessary to dispose a gas seal in the return duct for preventing gases from flowing upwardly into the particle separator connected to the upper end of the return duct. The gas may then be discharged from the return duct through conduits into the processing chamber. The height of the solid particle bed in the heat transfer chamber may, however, in many cases provide a gas seal i.e. sufficiently decrease the upward gas flow in the return duct, so that no additional gas seal is needed. Very small amounts of gas passing the bed may be allowed to flow up via the return duct into the particle separator.

The present invention provides a very simple CFB boiler construction. The return duct is preferably constructed as a narrow vertical channel having one wall in common with the combustion chamber, the wall being e.g. a typical membrane wall used in CFB boilers. The opposite wall may be a similar membrane wall. Outlets connecting the return duct with the processing chamber may be prefabricated into the wall.

According to another preferred embodiment of the present invention there is a heat transfer chamber disposed within the processing chamber, connected to the internal circulation thereof. In the processing chamber solid particles flowing downwardly along a wall, or particles moving in the fluidized bed, may be guided into the heat transfer chamber. The heat transfer chamber may be e.g. constructed as a wall chamber connected to one of the side walls in the processing chamber. The heat transfer chamber may be disposed at the side wall spaced a predetermined distance from the bottom of the processing chamber or it may stand close to or directly on the bottom, e.g. the grid. The wall chamber may protrude into the processing chamber or protrude outwardly from the processing chamber.

The wall chamber may be formed in a similar manner as the vertical return duct described earlier, having a narrow inlet passage and an extended lower part including the heat transfer surfaces. Particles captured by the wall chamber are allowed to form a heat transfer bed within the lower part of the wall chamber similar to the bed in the return duct described earlier. The heat transfer in the bed is controlled as in the return duct.

At high load conditions heat is typically primarily recovered in the return duct, whereas at low load conditions heat is recovered in a wall chamber connected to the internal circulation within the processing chamber.

According to a special embodiment of the present invention, heat transfer surfaces may be disposed evenly in heat transfer and solid particle transport zones. The solid particle zones are then very small compared to the heat transfer zones, so that the combined heat transfer surface area of the solid particle zones is very small compared to the combined heat transfer surface area of the combined heat transfer zones. At most only about 10% of the total heat transfer can be achieved from the combined heat transfer surfaces in the solid particle transport zones. About 10% of the total heat transfer surface area may be disposed in solid particle transport zones. At normal conditions an approximately even flow of fluidizing gas may be introduced into all zones. The fluidizing gas maintains heat transfer to heat transfer surfaces over the entire heat transfer chamber. The fluidizing gas introduced additionally provides, at the small solid particle transport zones, having outlet openings disposed therein, a solid particle flow from the heat transfer chamber into an adjacent processing chamber. For decreasing heat transfer, at low load conditions or at start up, gas flow may be minimized in all zones, i.e. heat transfer zones, except solid particle transport zones, through which solid material is recycled into the processing chamber. As solid particle transport zones are very small compared to the rest of the heat transfer chamber, only very small amounts of heat will be transferred in the zones.

One of the main advantages provided by the present invention is the possibility to control heat transfer independently from solid flow through a heat transfer chamber, even if only one single combined heat transfer and recycling chamber is used. The present invention provides a method according to which the heat transfer may be stopped without even disturbing the solid flow through the same chamber.

Heat transfer may be controlled by changing the proportion of gas introduced through different nozzles in the heat transfer chamber, without changing the total solid particle flow through the chamber. The total gas flow may be kept constant. The heat transfer may be increased by increasing the gas flow through nozzles situated below or close to heat transfer surfaces and decreased by increasing gas flow through nozzles situated further away from the heat transfer surfaces.

The invention further provides the ability to build compact heat transfer and processing chambers, which are especially advantageous in pressurized (superatmospheric pressure, typically over 2 bar) applications.

DETAILED DESCRIPTION OF THE DRAWINGS

Figure 1:
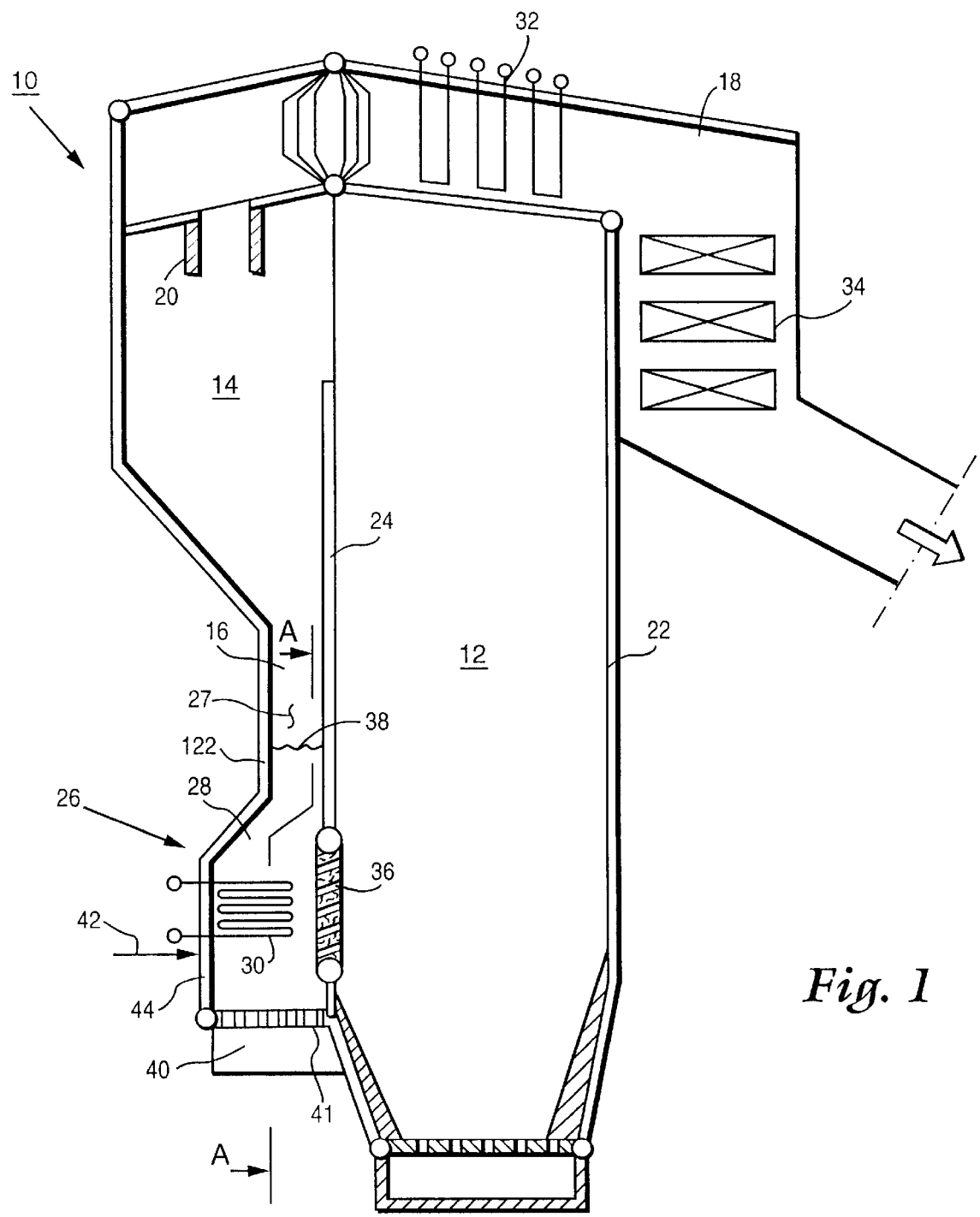
FIG. 1 is a schematic vertical cross section through an exemplary circulating fluidized bed reactor having a heat transfer chamber in its return duct, according to the invention.

FIG. 1 shows a circulating fluidized bed CFB combustor 10, having a combustion chamber or processing chamber 12 with an expanded fluidized bed of particles therein. A particle separator 14 is connected to the upper part of the combustion chamber 12, for separating particles entrained with the mixture of flue gases and solid material being discharged from the combustion chamber 12. A vertical channel like return duct 16 is provided for recirculating separated solid material from the separator 14 into the lower part of the combustion chamber 12. A convection section 18 is connected to a gas outlet 20 disposed in the upper part of the separator 14.

The walls 22, 24 in the combustion chamber 12 may be membrane walls, one wall 24 being in common with the combustion chamber 12 and the return duct 16. Similarly, the walls of the return duct may include two substantially plane tube walls 122, parallel with the walls of the processing chamber.

The lower part 26 of the return duct 16 has a larger horizontal cross section than the upper part 27 of the return duct 16. A bed 28 of at least partly fluidized solid particles is provided in the lower part 26. Heat transfer surfaces 30 are disposed in the bed 28 for recovering heat from the solid material being circulated in the CFB combustor system. The lower part 26 of the return duct 16 thus comprises a heat transfer chamber 26. Heat is also recovered with heat transfer surfaces 32,34 in the convection section 18.

Outlet openings 36 forming a solid flow seal, preventing uncontrolled flow of solid particles by gravity, are disposed in the heat transfer chamber 26 in the common wall 24 for recycling solid particles from the bed 28 into the combustion chamber 12. The outlet openings 36 are disposed so as to open into the bed 28 below its upper surface 38 level. The height of the bed 28 between the outlet openings 36 and the bed surface 38 provides a gas seal preventing gas from flowing from the combustion chamber 12 into the return duct 16 through the outlet openings 36.

Fluidizing gas is introduced into the bed 28 from a windbox 40, through a grid 41, in the bottom of the return duct 16, for at least partly fluidizing the bed. Transporting gas may additionally be introduced through nozzles 42 disposed to introduce transporting or fluidizing gas, through a side wall 44 in the heat transfer chamber 26. Fluidizing gas and/or transporting gas is used to fluidize at least partly the solid material in heat transfer chamber 26. The fluidizing or transporting gas may also be used to maintain an internal flow of solid particles within the bed, 28, e.g. for transporting solid particles horizontally within the bed 28. The fluidizing or transporting gas is also used for transporting solid particles towards and through the outlet openings 36.

Figure 2:
FIG. 2 is a partial cross sectional view of a lower part of the return duct in FIG. 1 taken along line AA of FIG. 1.
Figure 2:
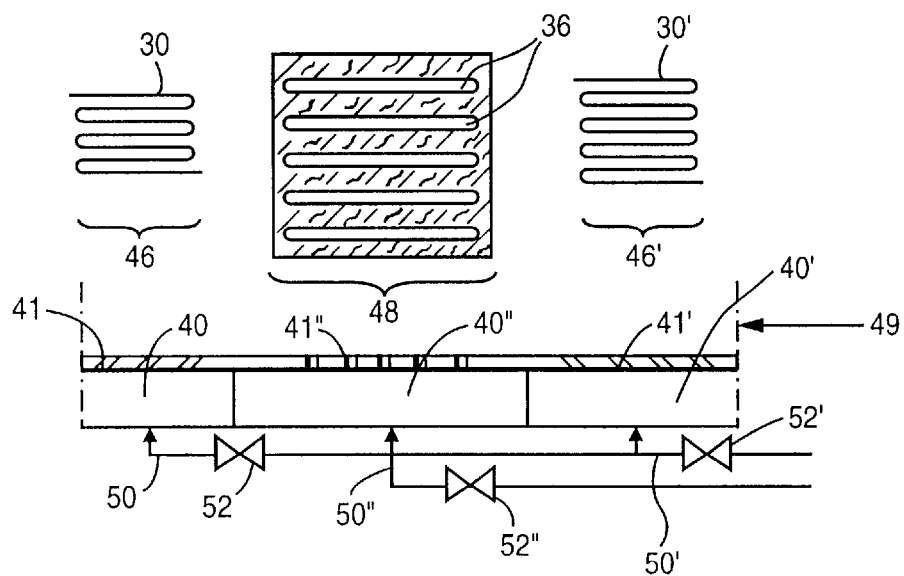

FIG. 2 shows that the heat transfer chamber 26 is divided into at least two heat transfer zones 46, 46', and a solid particle transporting zone 48, formed between the heat transfer zones. Heat transfer zones 46, 46' are formed by disposing heat transfer surfaces 30, 30' within the zones 46, 46'. Heat transfer zones 46,46' and the solid particle transporting zone 48 are fluidized by separately controlled gas flows 50, 50', 50" introduced through openings 40, 40', 40", respectively. The gas flows 50, 50', 50" are controlled by valves 52, 52', 52". Solid particle outlet openings 36 are provided in the wall 24 in the solid particle transporting zone 48.

Heat transfer may be controlled in the heat transfer chamber 26, shown in FIG. 2, by controlling the flow of fluidizing gas introduced into the different zones, especially the heat transfer zones 46 and/or 46'. It is e.g. possible to decrease heat so that by decreasing both or either of gas flows 50, 50', fluidization of solid particles around the heat transfer surfaces 30 and/or 30' decreases, as well as heat transfer in zones 46 and/or 46'. The flow of solid material through the heat transfer chamber 26, from the heat transfer chamber 26 into the combustion chamber 12, is not affected by the control of heat transfer as long as fluidizing gas is introduced into the solid particle transport zone 48.

Solid material may be introduced into the heat transfer chamber 26 evenly or unevenly over the whole width of the return duct 16, e.g., the whole width of side wall 24. The entrance point of solid particles is not of very great importance as solid particles can flow freely in all directions in the chamber 26. The entrance point may be above a heat transfer zone 46, 46' or above a solid particle transport zone 48. Solid material introduced into the heat transfer chamber 26 may thereby flow from different locations towards the outlet openings 36 and into the combustion chamber 12 even if heat transfer is decreased by decreasing fluidization in the heat transfer zones 46, 46'. If desired, solid flow through outlet openings 36 in a specific transport zone 48 may be prevented by decreasing the gas flow through openings 41" into that specific zone 48.

The heat transfer chamber 26 according to the present invention allows free flow of solid material between different zones 46,46",48, as no partition walls are used to prevent such flow. Fluidizing or transporting gas flows may be used to guide or transport solid particles between different zones and within the zones. Solid particles may flow freely from one zone, having a higher bed surface level 38 than the adjacent zone, to the lower adjacent zone virtually without the help of fluidizing or transporting gas.

Heat transfer surfaces (shown in dotted line at 49 in FIG. 2) may also be provided in the solid particle transport zone 48. While heat transfer surfaces 30, 30', 49 may be evenly spaced in and between the zones 46, 46', 48, desirably the total heat transfer surface area in the particle transport zone(s) 48 is very small, e.g., less than 25%, and preferably less than 10%, of the total heat transfer surface area in the heat transfer zones 46, 46'.

Figure 3:
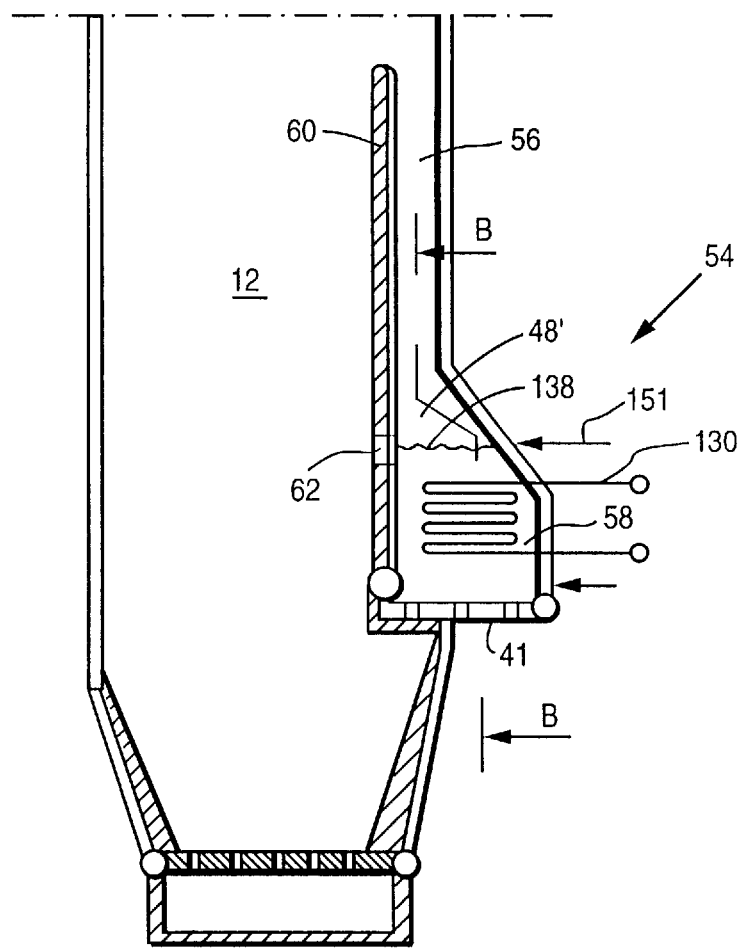
FIG. 3 is a schematic vertical cross section through a lower portion of a fluidized bed reactor having a heat transfer chamber within the processing chamber.

FIG. 3 shows a lower portion of a fluidized bed reactor having a wall chamber 54 for gathering solid particles from the internal circulation in the fluidized bed in the combustion chamber 12 and for recovering heat from the material gathered therein, according to another exemplary embodiment of the invention.

The wall chamber 54 has an inlet channel 56 in its upper part, a transition section 48' and a heat transfer chamber 58, with heat transfer surfaces 130 disposed therein, in its lower part. The wall chamber 54 may extend along a portion of a side wall 22', or along the entire side wall 22' in the combustion chamber 12. A partition wall 60 separates the wall chamber 54 from the combustion chamber 12.

An overflow opening 62 is disposed in the upper part of the heat transfer chamber 58 for allowing solid particles to overflow into the combustion chamber 12. Additional outlet openings 62, with solid flow seals, may be disposed below the bed surface level 138 if desired.

Figure 4:
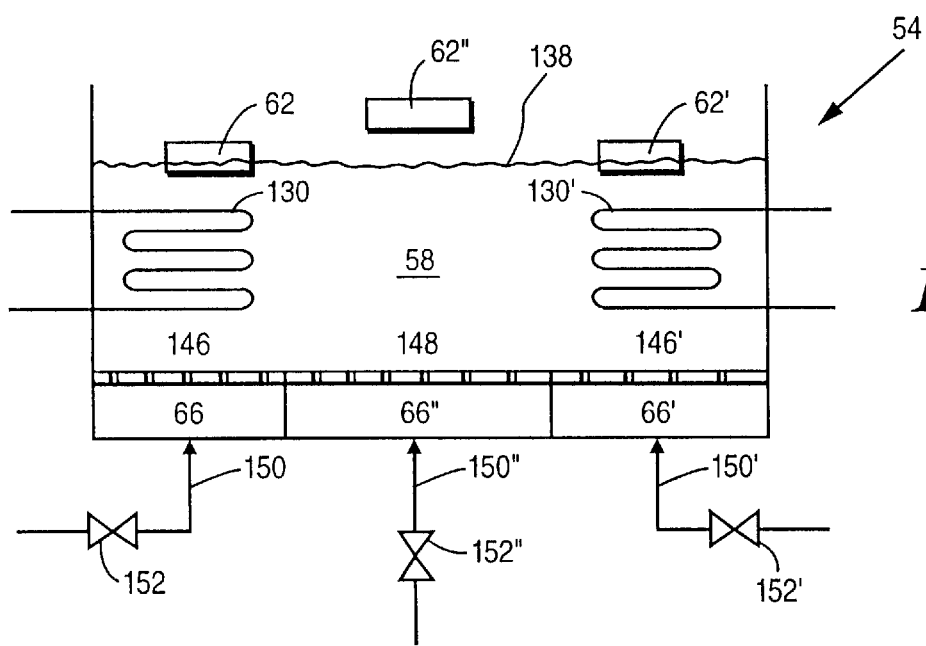
FIG. 4 is a partial cross section view of the heat transfer chamber in FIG. 3 taken along line BB of FIG. 3.

FIG. 4 shows a partial cross sectional view of the heat transfer chamber 58 taken along line BB hereof. The heat transfer chamber 58 is divided in two heat transfer zones 146, 146' and in one solid particle transport zone 148 therebetween. Heat transfer surfaces 130, 130' are disposed in the heat transfer zones 46, 46'.

Three overflow openings 62, 62',62", one opening 62" disposed at a higher level than the two others, are shown in FIG. 4, an opening 62, 62' being provided above each separate zone 146, 146'. Separately controlled fluidizing gas flows 150, 150', 150" are introduced through separate wind boxes 66, 66',66".

Heat transfer in the heat transfer chamber 58 may be decreased by decreasing gas flows 150 and 150', so that fluidization of the solid particles around heat transfer surfaces 130, 130' will decrease, as well as heat transfer. Solid particles introduced into the heat transfer chamber 58 may, however, continue to flow through overflow openings 62, 62'. If the bed level 138 in the heat transfer chamber increases then solid particles may be discharged by overflow through opening 62".

Under some special circumstances, it may be necessary to stop fluidization completely in the bottom part of the heat transfer chamber 58, then solid particles may still be recycled into the combustion chamber 12 by overflow, with the help of fluidizing or transport gas introduced through nozzles 151 (see FIG. 3) disposed above the solid particle transport and heat transfer surfaces 130, 130'. Thus a solid particle transport zone is disposed vertically above a heat transfer zone 146, 146'.

While the invention has been described in connection with what is presently considered to be most practical and preferred embodiment of the invention, it is to be understood that the invention is not to be limited to the disclosed embodiments, but on the contrary, is intended to cover various modifications and equivalent devices and methods included within the spirit and scope of the appended claims.

What is claimed is:

1. Apparatus for recovering heat from solid particles in a circulating fluidized bed reactor comprising:

a processing chamber with a first fluidized bed of solid particles therein;

a separator connected to an upper outlet of the processing chamber;

a return duct connected to a lower portion of the separator;

a non-partitioned heat transfer chamber, connected to a bottom portion of said return duct and to said processing chamber having a second fluidized bed of solid particles continuous through the heat transfer chamber;

a plurality of heat transfer surfaces disposed in said bed in the non-partitioned heat transfer chamber;

inlet means for introducing a continuous flow of hot solid particles from said processing chamber into said heat transfer chamber, via the separator and return duct, and onto an upper surface of the second fluidized bed of solid particles;

outlet means for continuously recycling solid particles from said heat transfer chamber into said processing chamber;

nozzle means for introducing gas into said heat transfer chamber;

said heat transfer chamber including at least one heat transfer zone and at least one solid particle transport zone disposed at substantially the same horizontal level, wherein more heat transfer surface area is disposed in said at least one heat transfer zone than is disposed in said at least one solid particle transport zone and wherein said outlet means is disposed in said at least one solid particle transport zone;

the heat transfer and transport zones are arranged to permit free flow of the solid particles between the zones, and the heat transfer and the transport zones are adjacent each other;

means for controlling the heat transfer in said heat transfer chamber, said means including separately controlled means for introducing different flows of gas into said at least one heat transfer zone and said at least one solid particle transport zone via said nozzle means, and means for introducing transporting gas flows in the heat transfer chamber to control the flow of solid particles through the solid particle transport zone and the outlet means.

2. Apparatus as recited in claim 1, wherein said at least one heat transfer zone comprises two or more heat transfer zones disposed at the same horizontal level in said heat transfer chamber, said heat transfer zones being separated from each other by said at least one solid particle transport zone, and more heat transfer surface area is disposed in each of the two or more heat transfer zones than is disposed in said at least one particle transport zone.

3. Apparatus as recited in claim 1, wherein said outlet means comprises openings for discharging solid particles by overflow.

4. Apparatus as recited in claim 1, wherein said outlet means comprises several narrow horizontal slots disposed below the upper surface level of the second fluidized bed in said heat transfer chamber.

5. Apparatus as recited in claim 1, wherein said heat transfer surfaces are evenly spaced from each other in the heat transfer chamber, and wherein the combined area of all heat transfer surface areas in said at least one solid particle transport zone is 25% or less of the combined area of all heat transfer surface areas in said at least one heat transfer zone.

6. Apparatus as recited in claim 5, wherein the combined area of all heat transfer surface areas in said at least one solid particle transport zone is less than 10% of the combined area of all heat transfer surface areas in said at least one heat transfer zone.

7. Apparatus as recited in claim 1, wherein said heat transfer surfaces are disposed evenly in both said at least one heat transfer zone and said at least one solid particle transport zone, and wherein the total heat transfer in said at least one solid particle transport zone is less than 10% of the total heat transfer in said at least one heat transfer zone.

8. Apparatus as recited in claim 1 wherein said at least one heat transfer zone comprises a plurality of heat transfer zones; and wherein no heat transfer surfaces are in said at least one solid particle transport zone.

9. Apparatus as recited in claim 1 wherein said at least one heat transfer zone comprises a plurality of heat transfer zones; and wherein heat transfer surfaces are provided in both said heat transfer zones and said at least one solid particle transport zone, and each of the heat transfer zones has heat transfer surfaces with areas that are greater than a heat transfer surface area in the at least one solid particle transport zone.

10. Apparatus as recited in claim 1 wherein said at least one heat transfer zone consists of two heat transfer zones and said at least one solid particle zone consists of a single particle transport zone between said two heat transfer zones, and each of the two heat transfer zones has a heat transfer surface area greater than an area of a heat transfer surface area in the single particle transport zone.

11. Apparatus as recited in claim 10 wherein no heat transfer surfaces are provided in said particle transport zone.

12. Apparatus as recited in claim 10 wherein said heat transfer surfaces are provided in said particle transport zone, the combined heat transfer surface area in said particle transport zone being 25% or less of the combined heat transfer surface area in said heat transfer zones.

13. Apparatus as recited in claim 10 wherein said means for introducing different flows of gas comprises a separately valved conduit for each zone.

14. Apparatus as recited in claim 1 wherein said means for introducing different flows of gas comprises a separately valved conduit for each zone.

15. Apparatus as in claim 1 wherein said outlet means comprises first and second openings between the heat transfer chamber and processing chamber, such that the first opening is disposed horizontally below the second opening.

16. Apparatus as in claim 15 wherein the second opening is aligned with the at least one transport zone and the first opening is aligned with at least the at least one heat transfer zone.

17. Apparatus as in claim 15 wherein the first and second openings are overflow openings.

18. Apparatus as in claim 1 further comprising a common wall shared by the heat transfer chamber and processing chamber, and said outlet means being one or more openings in the common wall.

19. Apparatus for recovering heat from solid particles in a circulating fluidized bed reactor, comprising:
  a processing chamber with a fluidized bed of solid particles therein,
  a separator connected to an upper outlet of the processing chamber;
  a return duct connected to a lower outlet of the separator;
  a non-partitioned heat transfer chamber, connected to a lower end of the return duct and to said processing chamber, said heat transfer chamber sharing a common wall with the processing chamber, and said heat transfer chamber further having a second fluidized bed of solid particles continuous through the non-partitioned heat transfer chamber;
  a plurality of heat transfer surfaces disposed in said heat transfer chamber;
  inlet means for introducing a continuous flow of hot solid particles from said processing chamber and onto an upper surface of the second fluidized bed in the heat transfer chamber, via the separator and return duct;
  outlet means for continuously recycling solid particles from said heat transfer chamber into said processing chamber and said outlet means disposed in at least one solid particle transport zone, where said outlet means is integral with the common wall between the processing chamber and heat transfer chamber;
  nozzle means for introducing gas into said heat transfer chamber;
  said heat transfer chamber including at least one heat transfer zone and said at least one solid particle transport zone disposed at substantially the same horizontal level, more heat transfer surfaces disposed in said at least one heat transfer zone than are disposed in said at least one solid particle transport zone;
  the heat transfer and transport zones are arranged to permit free flow of the solid particles between the zones, and the heat transfer and the transport zones are adjacent each other;
  means for controlling the heat transfer in said heat transfer chamber, said means including separately controlled means for introducing different flows of gas into said at least one heat transfer zone and said at least one solid particle transport zone via the nozzle means;
  wherein said return duct has a first substantially plane tube wall having wall sections parallel with a wall of said processing chamber, and wherein said inlet means comprises at least one substantially rectangular outlet slot in said wall of said processing chamber forming an inlet opening into said heat transfer chamber, and
  means for introducing transporting gas flows in the heat transfer chamber to control the flow of solid particles through the solid particle transport zone and the outlet means.

20. Apparatus for recovering heat from solid particles in a circulating fluidized bed reactor, comprising:
  a processing chamber with a fluidized bed of solid particles therein;
  a separator connected to an upper outlet of the processing chamber;
  a return duct connected to a lower outlet of the separator;
  a non-partitioned heat transfer chamber, connected to a bottom portion of said return duct and to an inlet of the processing chamber, said heat transfer chamber sharing a common wall with the processing chamber, and the heat transfer chamber having a second fluidized bed of solid particles continuous through the non-partitioned heat transfer chamber;
  a plurality of heat transfer surfaces disposed in said heat transfer chamber;
  inlet means for introducing a continuous flow of hot solid particles from said processing chamber via the separator and return duct, an onto an upper surface of said heat transfer chamber;
  outlet means for continuously recycling solid particles from said heat transfer chamber through at least one solid particle transport zone into said processing chamber, where said outlet means is integral with the common wall between the processing chamber and heat transfer chamber;

nozzle means for introducing gas into said heat transfer chamber;

said heat transfer chamber including at least one heat transfer zone and said at least one solid particle transport zone disposed at substantially the same horizontal level, more heat transfer surfaces disposed in said at least one heat transfer zone than are disposed in said at least one solid particle transport zone;

the heat transfer and transport zones are arranged to permit free flow of the solid particles between the zones, and the heat transfer and the transport zones are adjacent each other;

means for controlling the heat transfer in said heat transfer chamber, said means including separately controlled means for introducing different flows of gas into said at least one heat transfer zone and said at least one solid particle transport zone via the nozzle means;

means for introducing transporting gas flows in the heat transfer chamber to control the flow of solid material through the solid particle transport zone and the outlet means, and wherein said heat transfer chamber is disposed internally within the processing chamber.

* * * * *